(12) United States Patent
Suzuki et al.

(10) Patent No.: US 9,126,853 B2
(45) Date of Patent: Sep. 8, 2015

(54) FRESH WATER GENERATOR

(75) Inventors: Hironobu Suzuki, Otsu (JP); Yuji Tanaka, Otsu (JP); Hiroo Takabatake, Otsu (JP); Yoshisuke Nakamura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 613 days.

(21) Appl. No.: 13/391,354

(22) PCT Filed: May 25, 2010

(86) PCT No.: PCT/JP2010/058800
§ 371 (c)(1),
(2), (4) Date: Feb. 20, 2012

(87) PCT Pub. No.: WO2011/021420
PCT Pub. Date: Feb. 24, 2011

(65) Prior Publication Data
US 2012/0145610 A1 Jun. 14, 2012

(30) Foreign Application Priority Data

Aug. 21, 2009 (JP) .................. 2009-191820

(51) Int. Cl.
| | | |
|---|---|---|
| *B01D 61/12* | (2006.01) | |
| *B01D 61/20* | (2006.01) | |
| *B01D 61/22* | (2006.01) | |
| *C02F 1/44* | (2006.01) | |
| *G05D 11/03* | (2006.01) | |
| *B01F 3/08* | (2006.01) | |
| *B01D 61/02* | (2006.01) | |
| *C02F 103/02* | (2006.01) | |
| *C02F 103/04* | (2006.01) | |

(52) U.S. Cl.
CPC . *C02F 1/44* (2013.01); *B01D 61/02* (2013.01); *B01D 61/12* (2013.01); *B01D 61/20* (2013.01); *B01D 61/22* (2013.01); *B01F 3/088* (2013.01); *B01F 3/0865* (2013.01); *G05D 11/03* (2013.01); *B01D 2317/022* (2013.01); *B01D 2317/04* (2013.01); *C02F 1/441* (2013.01); *C02F 1/442* (2013.01); *C02F 2103/02* (2013.01); *C02F 2103/04* (2013.01); *C02F 2301/08* (2013.01)

(58) Field of Classification Search
CPC ........ B01D 61/04; B01D 61/10; B01D 61/12; B01D 61/16; B01D 61/20; B01D 61/22; B01D 61/58; B01D 2317/00; B01D 2317/02; B01D 2317/022; B01D 2317/04; B01D 61/022; B01D 61/025; B01D 61/08; B01D 61/142; B01D 61/45; B01D 61/147; B01D 61/18; B01D 65/00; B01D 2311/04; B01D 2311/06; B01D 2311/08; B01D 2311/12; B01D 2311/16; B01D 2311/22; B01D 2311/246; B01D 2311/2688; B01D 2318/08; B01D 2318/083; B01D 2318/50; B01D 2317/025; B01D 2317/06; B01D 2317/08; C02F 1/44; C02F 1/441; C02F 1/442; C02F 2301/08; C02F 1/006; C02F 1/444; C02F 3/00; C02F 2203/00; C02F 2209/00; C02F 2209/40; C02F 2209/42; C02F 2209/44; C02F 2301/04; C02F 2301/043; G05D 11/02; G05D 11/03; G05D 11/035; B01F 3/08; B01F 3/0803; B01F 3/0861; B01F 3/0865; B01F 3/088; B01F 2003/0884; B01F 2215/045
USPC .............. 210/101, 134, 137, 257.2, 258, 259, 210/321.6, 87, 103, 130, 132, 138, 416.1, 210/416.3, 631, 641, 650, 739, 744; 366/131, 134, 152.1, 154.1, 160.1, 366/160.2, 160.3, 162.1, 160.5; 137/3, 137/109–111, 114, 115.01, 115.03, 115.04
See application file for complete search history.

(56) References Cited

U.S. PATENT DOCUMENTS

| | | | | |
|---|---|---|---|---|
| 5,207,916 | A | * | 5/1993 | Goheen et al. ................ 210/637 |
| 6,113,797 | A | | 9/2000 | Al-Samadi |
| 6,187,200 | B1 | * | 2/2001 | Yamamura et al. ........... 210/652 |
| 6,645,383 | B1 | * | 11/2003 | Lee et al. ...................... 210/652 |

| | | | |
|---|---|---|---|
| 6,946,081 B2* | 9/2005 | Voutchkov | 210/774 |
| 7,368,058 B2* | 5/2008 | Nishikawa et al. | 210/652 |
| 7,981,295 B2* | 7/2011 | Al-Samadi | 210/652 |
| 2005/0067341 A1* | 3/2005 | Green et al. | 210/321.69 |
| 2006/0144787 A1* | 7/2006 | Schmidt et al. | 210/637 |
| 2008/0067125 A1 | 3/2008 | Wilkins | |
| 2008/0314807 A1* | 12/2008 | Junghanns et al. | 210/85 |
| 2009/0090676 A1* | 4/2009 | Johnson | 210/747 |
| 2009/0188867 A1* | 7/2009 | Vuong et al. | 210/652 |
| 2009/0283464 A1* | 11/2009 | Oe et al. | 210/198.1 |
| 2010/0224558 A1* | 9/2010 | Barker | 210/636 |
| 2010/0314313 A1* | 12/2010 | MacLaggan | 210/615 |
| 2011/0042306 A1 | 2/2011 | Ito | |
| 2011/0056878 A1* | 3/2011 | Matsushiro et al. | 210/257.2 |
| 2011/0139712 A1 | 6/2011 | Ito | |
| 2011/0139716 A1 | 6/2011 | Ito | |
| 2011/0147310 A1 | 6/2011 | Ito | |
| 2011/0163036 A1 | 7/2011 | Ito | |
| 2011/0315632 A1* | 12/2011 | Freije et al. | 210/636 |

FOREIGN PATENT DOCUMENTS

| | | | |
|---|---|---|---|
| CN | 2910907 Y | | 6/2007 |
| JP | 4137795 | | 12/1992 |
| JP | 11010146 | | 1/1999 |
| JP | 2001239134 | | 9/2001 |
| JP | 2002205070 | | 7/2002 |
| JP | 2003200182 | | 7/2003 |
| JP | 2003251383 | | 9/2003 |
| JP | 2003285058 | | 10/2003 |
| JP | 2004-81903 | A | 3/2004 |
| JP | 2005-224651 | A | 8/2005 |
| JP | 3957081 | | 5/2007 |
| JP | 2007152265 | | 6/2007 |
| JP | 2007313445 | | 12/2007 |
| JP | 2008100219 | | 5/2008 |
| JP | 2008126137 | | 6/2008 |
| JP | 2008-161797 | A | 7/2008 |
| WO | 2006099080 | | 9/2006 |
| WO | WO 2006/128730 | A1 | 12/2006 |
| WO | 2007144591 | | 12/2007 |
| WO | WO2010/061879 | A1 | 6/2010 |

OTHER PUBLICATIONS

Chinese Office action dated Mar. 8, 2013, application No. 201080034218.9.
Entire patent prosecution history of U.S. Appl. No. 13/386,231, filed, Aug. 14, 2012, entitled, "Water Producing System."
International Search Report dated Aug. 17, 2010, Application No. PCT/JP2010/058523.
Supplementary European Search Report dated Nov. 12, 2013, Application No. EP 10802121.
A. J. van Gottberg et al., "World\s Largest Membrane-based Water Reuse Project", Proc. IDA World Congress, Bahama, 2003.
Chinese Office Action with English Translation, issued Jan. 10, 2014, application No. 201180014114.6.
Decision on Rejection Based on Corresponding Chinese Patent Application, CN 201180014114.6, With English Translation, Issued Jun. 30, 2014.
Entire patent prosecution history of U.S. Appl. No. 13/517,165, filed Jun. 19, 2012, entitled, "Water Producing System and Operation Method Therefor."
Entire patent prosecution history of U.S. Appl. No. 13/634,681, filed Sep. 13, 2012, entitled, "Method for Producing Fresh Water."
In-Depth Examination Result and English Translation for Corresponding Mexican Patent Application No. MX/a/2012/010665, Issued on Oct. 20, 2014.
International Search Report dated Jan. 18, 2011, application No. PCT/JP2010/068244.
International Search Report dated May 10, 2011, application No. PCT/JP2011/055538.
J. S. S. Chin et al., "Increasing Water Resources through Desalination in Singapore: Planning for Sustainable Future", Proc. IDA World Congress, Dubai, Nov. 7-12, 2009, PEF: IDAWC/DB09-033, pp. 1-7.
Kobelco Eco-Solutions Co., Ltd, and other three companies, model project of Ministry of Economy, Trade and Industry, demonstration trials in Shunan-shi, [on-line], Mar. 5, 2009, Nippon Suido Shinbun Co., [search on Jul. 2, 2009], internet <URL: http://www.suido-gesuido.co.jp/blog/suido/2009/03/post_2780.html>.
Patent Examination Report No. 1 (Office Action) Based on Corresponding Australian Patent Aplication, AU 2011228323, Issued Aug. 22, 2014.
Singapore Office Action issued Sep. 26, 2013, application No. 201206766-6.
Singapore Second Written Opinion, Issued May 14, 2014, for Application No. 201206766-6.
Office Action dated Jan. 26, 2015 for U.S. Appl. No. 13/517,165.
International Search Report dated Aug. 17, 2010, application No. PCT/JP2010/058800.

\* cited by examiner

*Primary Examiner* — Joseph Drodge
(74) *Attorney, Agent, or Firm* — RatnerPrestia (57) ABSTRACT

Disclosed is a fresh water generator for fresh water production, which is effective to prevent a membrane life from becoming worse by suppressing the load on the membrane of a second semi-permeable membrane treatment facility when the concentrated water produced by the treatment of a first semi-permeable membrane treatment facility, and water to be treated with different osmotic pressure there from are mixed and treated with the second semi-permeable membrane treatment facility by the fresh water generator which comprises a means for storing the concentrated water produced from the first semi-permeable membrane treatment facility and water (B) to be treated, which is separately supplied in a storage tank A and a storage tank B in such a manner that the flow rate (mixture ratio) of the concentrated water to the water (B) to be treated is maintained constant, and supplying the concentrated water and the water (B) to be treated from each of the storage tanks to the second semi-permeable membrane treatment facility at a predetermined flow rate in at least a treatment process for treating water (A) to be treated with the first semi-permeable membrane treatment facility so as to obtain fresh water.

7 Claims, 8 Drawing Sheets

FRESH WATER GENERATOR

CROSS REFERENCE TO RELATED APPLICATIONS

This application is the U.S. National Phase Application of PCT International Application No. PCT/JP2010/058800, filed May 25, 2010, and claims priority to Japanese Patent Application No. 2009-191820, filed Aug. 21, 2009, the disclosure of each being incorporated herein by reference in its entirety for all purposes.

FIELD OF THE INVENTION

The present invention relates to a fresh water generator for producing fresh water from multiple types of raw water by a fresh water production system using a composite water treatment technology. In more detail, this invention relates to a fresh water generator allowing energy-saving and efficient production of fresh water, applicable as a fresh water generator in the water purification field for public water supply and in the industrial fresh water production field for producing industrial water, food and medical process water and semiconductor washing water.

BACKGROUND OF THE INVENTION

In recent years, numerous technologies concerning water have been developed, and among them, the use of membrane separation methods is widely spread in various fields owing to such features as energy saving, space saving, labor saving and higher product quality.

The separation membranes used for water treatment can be classified into two major groups; nano filtration membranes (NF membranes)/reverse osmosis membranes (RO membranes) and microfiltration membranes (MF membranes)/ultrafiltration membranes (UF membranes). The former is used for removing salt, ions, etc. from seawater and brine water, and on the other hand, the latter is used in water purification processes for producing industrial water and tap water from river water, groundwater and treated-sewage water. Further, sewage and industrial wastewater which have been treated by activated sludge methods are now actively treated by methods called "membrane separation activated sludge methods (=membrane bioreacters (MBR))" having MF membranes/UF membranes directly immersed in activated sludge tanks.

In the recent situation where water shortage is acute and chronic, water treatment methods using these membranes are further technically developed, and in recent years, numerous fresh water production facilities employing the technology called the integrated membrane system (IMS) in which fresh water is efficiently produced by removing organic matter and fine particles in seawater or brine water using MF membranes/UF membranes or purifying sewage or industrial wastewater by MBR as pretreatment and subsequently treating with RO membranes are constructed in the Middle East, Asia and other regions suffering from water shortage.

Present systems for producing fresh water from seawater and brine water include, for example, technologies in which the pretreatment by sand filtration as a conventional water purification technology is followed by the treatment using NF membranes/RO membranes, and also methods in which the pretreatment of seawater or brine water using MF membranes/UF membranes is followed by the treatment using NF membranes/RO membranes as described before. In these systems, since the salt of seawater cannot be removed by the pretreatment, the removal of salt entirely relies on the latter treatment using NF membranes/RO membranes. Accordingly in the membrane treatment method of using NF membranes/RO membranes requiring a supply pressure higher than the osmotic pressure, a pump called "booster pump" must be used for pressurization in order to supply raw water to NF membranes/RO membranes. That is, if the salt concentration of the raw water supplied to NF membranes/RO membranes is higher, the osmotic pressure is higher, and consequently high pressurization by a booster pump is required to consume much energy for operating the booster pump.

In order to solve these problems, membrane treatment systems in which advanced sewage treatment and seawater desalination are integrated, described in non-patent documents 1 and 2, were developed.

According to these technologies, after sewage is treated by MBR, RO membranes are used to produce fresh water. Further, the concentrated water produced when the RO membrane treatment is performed is mixed with seawater. Therefore, fresh water can be produced more efficiently than before, and the salt concentration in the seawater treated by the RO membranes can be lowered for allowing the pressurization by the booster pump to be reduced more than before when the booster pump is used to operate the RO membrane treatment used for seawater desalination. Thus, a more energy-saving system can be realized.

Figure 1:
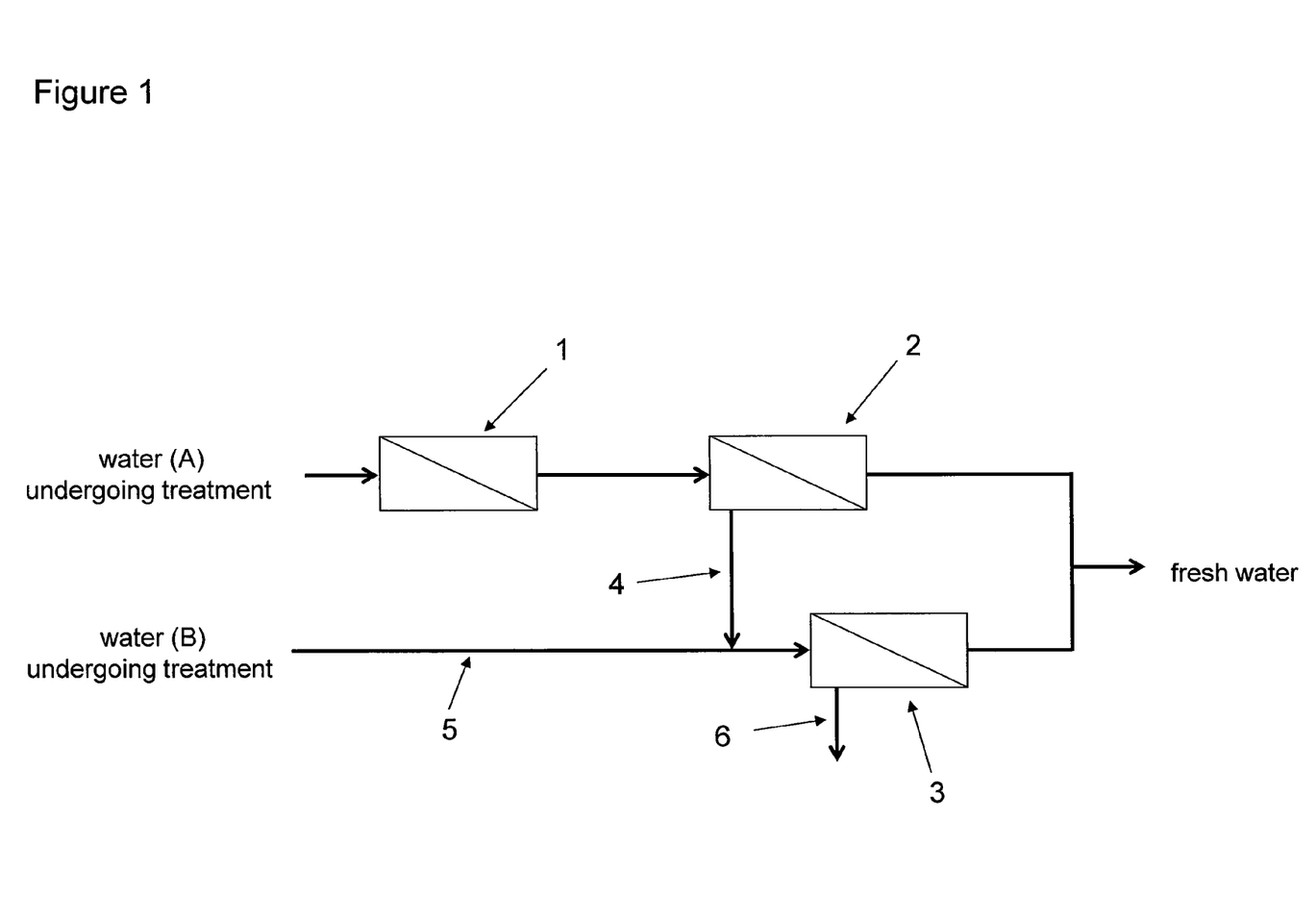
FIG. 1 is a flowchart showing a conventional integrated sewage treatment-seawater desalination system.

In these technologies, it is supposed that the RO membrane-concentrated water produced as a byproduct from the sewage treatment line for treating sewage with MBR and RO membranes is joined as it is with the seawater supplied to a seawater desalination treatment line. Therefore, each of the non-patent documents 1 and 2 shows a treatment flowchart as shown in FIG. 1. FIG. 1 is a flowchart of the conventional integrated sewage treatment-seawater desalination system described in each of the non-patent documents 1 and 2. In FIG. 1, water (A) undergoing treatment (sewage) is treated by a pretreatment apparatus (1) (MBR) to decompose the organic matter and to separate and remove suspended components, fine particles, etc., for obtaining treated water. Further, the treated water is subjected to RO membrane treatment in a first semipermeable membrane treatment apparatus (2) (RO membrane treatment apparatus) on the treatment line side for the water (A) undergoing treatment, to obtain produced water (fresh water) and concentrated water. In the technologies described in the abovementioned documents, the concentrated water obtained here is made to join the treatment line for water (B) undergoing treatment, and mixed with the water (B) undergoing treatment (seawater), for decreasing the osmotic pressure of the water (B) undergoing treatment. The water (B) undergoing treatment mixed with the concentrated water is subjected to RO membrane treatment in a second semipermeable membrane treatment apparatus (3) (RO membrane treatment apparatus), to obtain produced water (fresh water) and concentrated water. Subsequently the produced water (fresh water) obtained in the first semipermeable membrane treatment (2) is joined with that obtained in the second semipermeable membrane treatment apparatus (3), to be used for any of various applications as fresh water.

However, in these technologies, in the case where the pretreated water obtained by pretreating sewage, industrial wastewater or seawater by MF membranes/UF membranes is used as raw water, the amount of the treated water may change hour by hour or day by day. In the treatment flow of FIG. 1, the piping (4) of the concentrated water flowing from the first semipermeable membrane treatment apparatus (2) is merely connected with the piping (5) of the water (B) undergoing treatment, and the flow rate of the concentrated water and the flow rate of the water (B) undergoing treatment are not controlled. Further, after the concentrated water and the water (B) undergoing treatment are joined, there is no means provided for mixing the two types of water.

In the conventional treatment flow as described above, in the case where the aforementioned amount of the treated water changes, when the RO membrane-concentrated water produced as a byproduct from the sewage treatment line and seawater are mixed, the mixing ratio changes to change the water quality such as salt concentration (osmotic pressure) supplied to the RO membranes on the seawater treatment line side after mixing. If the water quality such as salt concentration of feed water changes, the load acting on the RO membranes becomes large, not allowing stable treatment, and the life of the membranes is likely to be shortened. Further, depending on the specifications of the second semipermeable membrane treatment apparatus, there is also a problem that the operation of the second semipermeable membrane treatment apparatus (3) must be entirely or partially suspended. Furthermore, in the flowchart of each of the non-patent documents 1 and 2, since no positively mixing means is installed at a position downstream of the joint of the two pipings, the mixed water is not homogeneously mixed, and concentration-polarized (osmotic pressure-polarized) water is likely to be supplied to the RO membranes. Also in this case, the load acting on the RO membranes becomes large, not allowing stable treatment, and the life of membranes is likely to be shortened. If the life of membranes becomes short, there is such a problem that more frequent maintenance and RO membrane exchange become necessary. Further, as described above, though depending on the specifications of the second semipermeable membrane treatment apparatus (3), there may also be another problem that the operation of the second semipermeable membrane treatment apparatus (3) must be entirely or partially stopped.

Meanwhile, in a water treatment system in which raw water is pretreated and supplied to RO membranes, it is for example known that after sand filtration treatment is performed as pretreatment, the treated water is stored in a pretreated water tank, and that a supply pump and a high pressure pump are used to feed the raw water to RO membranes or that an inverter is used to control the feed rate of the high pressure pump (patent document 1).

Further, in the case where RO membranes are connected in series to perform seawater desalination, it is known that when the concentrated water produced by treating seawater by a first stage of RO membranes is supplied to a second stage of RO membranes, a valve for adjusting the flow rate thereof or the operation pressure or a relay water tank is installed (patent document 2).

Further, in the case where RO membranes are connected in series as in patent document 2, to perform seawater desalination, it is known that an RO membrane module consisting of two RO membrane elements is provided as a first stage of RO membranes, and that after the water treated by one of the RO membrane elements is mixed with that of the other RO membrane element, the mixed water is supplied to a second stage of RO membranes, when a flow regulating valve is used for control (patent document 3).

These means can be used to adjust the flow rate of the raw water supplied to the latter stage of RO membrane treatment.

However, in a fresh water production system in which different types of raw water are mixed as described before, the amount of the raw water supplied from the previous stage of treatment can change to change or heterogenize the water quality after mixing. Therefore, it is difficult to solve the aforementioned problems merely by regulating the flow rate using a regulating valve or installing a water tank.

LISTING OF DOCUMENTS

Patent Documents

Patent document 1: JP 9-29252 A
Patent document 2: JP 2006-167533 A
Patent document 3: JP 2004-97911 A Non-Patent Documents Non-patent document 1: "Kobelco Eco-Solutions Co., Ltd., et al., "Model Project of Ministry of Economy, Trade and Industry: Demonstration Experiment in Shunan City," [online], Mar. 5, 2009, Nihon Suido Shimbun, [retrieved on Jul. 2, 2009], internet http://www.suido-gesuido.co.jp/blog/suido/2009/03/post_2780.html Non-patent document 2: "Adoption of 'Findings of Technical Series Toward Low-Carbon Society—Social System Demonstration Model Project,'" [online], Mar. 2, 2009, Toray Industries, Inc. Press Release, [retrieved on Jul. 2, 2009], internet http://www.toray.co.jp/news/water/nr090302.html

SUMMARY OF THE INVENTION

The invention provides a freshwater generator for producing freshwater from multiple types of raw water using a composite water treatment technology, wherein the concentrated water produced by treating water (A) undergoing treatment by a first semipermeable membrane treatment apparatus is mixed with water (B) undergoing treatment, to be treated by a second semipermeable membrane treatment apparatus, which generator is effective for keeping constant the flow rate ratio (mixing ratio) between the aforementioned concentrated water and the aforementioned water (B) undergoing treatment, for keeping low the load acting on the membranes of the aforementioned second semipermeable membrane treatment apparatus, and for not shortening the life of the membranes.

To solve the aforementioned problems, this invention includes the following exemplary configurations.

(1) A fresh water generator provided at least with a treatment process (A) for producing fresh water by treating water (A) undergoing treatment by a first semipermeable membrane treatment apparatus and a treatment process (B) for mixing the concentrated water outflowing from the aforementioned first semipermeable membrane treatment apparatus with separately supplied water (B) undergoing treatment and treating the mixed water by a second semipermeable membrane treatment apparatus, for producing fresh water, wherein a storage tank (A) and a storage tank (B) are provided respectively for storing the aforementioned concentrated water outflowing from the aforementioned first semipermeable membrane treatment apparatus and the aforementioned water (B) undergoing treatment before they are joined; and means for controlling the flow rates of the aforementioned concentrated water (A) and the aforementioned water (B) undergoing treatment supplied from the storage tanks (A) and (B) are further provided.

(2) A fresh water generator, according to (1), wherein the osmotic pressure of the aforementioned water (A) undergoing treatment is equal to or lower than the osmotic pressure of the aforementioned water (B) undergoing treatment.

(3) A freshwater generator, according to (1) or (2), wherein a pretreatment apparatus is provided on the upstream side of the aforementioned storage tank (B).

(4) A fresh water generator, according to any one of (1) through (3), wherein a storage tank (C) for storing the aforementioned concentrated water and the aforementioned water (B) undergoing treatment is provided, and a means for controlling the flow rate of the mixed water supplied from the aforementioned storage tank (C) to the aforementioned second semipermeable membrane treatment apparatus is further provided.

(5) A fresh water generator, according to any one of (1) through (4), wherein a means for mixing the aforementioned concentrated water and the aforementioned water (B) undergoing treatment is provided.

(6) A fresh water generator, according to any one of (1) through (5), wherein the osmotic pressure of the aforementioned concentrated water is equal to or lower than the osmotic pressure of the aforementioned water (B) undergoing treatment.

(7) A fresh water generator, according to any one of (1) through (6), wherein one type or more selected from electromagnetic opening-closing valves capable of adjusting the openings thereof for flow control, inverter-controlled opening-closing valves capable of controlling the openings thereof for flow control, and pumps capable of inverter-controlling the feed rates thereof for flow control are respectively provided halfway on the feed pipings of the aforementioned concentrated water and the aforementioned water (B) undergoing treatment as means for controlling the feed rates of the concentrated water and the water (B) undergoing treatment supplied from the storage tanks (A) and (B).

(8) A fresh water generator, according to (7), wherein a pump and/or an opening-closing valve each is provided halfway on the feed pipings of the aforementioned concentrated water and the aforementioned water (B) undergoing treatment.

(9) A fresh water generator, according to any one of (5) through (8), wherein one or more selected from the aforementioned storage tank (C) provided with a stirring means, an intra-pipe stirring device and a stirring means provided with baffle boards are provided as means for mixing the aforementioned concentrated water and the aforementioned water (B) undergoing treatment.

According to an exemplary embodiment of this invention, in the case where the concentrated water of a first semipermeable membrane treatment apparatus and other water (B) undergoing treatment are mixed, the mixed water being treated by a second semipermeable membrane treatment apparatus in a plant for producing freshwater from multiple types of raw water using a composite water treatment technology, the flow rate ratio (mixing ratio) of the concentrated water and the water (B) undergoing treatment can be kept constant, and the variation of the load acting on the treatment medium (semipermeable membranes) of the aforementioned second semipermeable treatment apparatus can be decreased, while the life of the membranes can be prevented from being shortened.

DETAILED DESCRIPTION OF CERTAIN EMBODIMENTS OF THE INVENTION

Desirable modes for carrying out this invention are explained below in reference to drawings, though the scope of this invention is not limited thereto or thereby.

One of the conventional fresh water production systems for producing fresh water from multiple types of raw water is the integrated sewage treatment-seawater desalination system shown in the flowchart of FIG. 1 (non-patent documents 1 and 2). In the conventional fresh water production system, if any problem should occur in the whole or part of the first semipermeable membrane treatment apparatus (2) or if the apparatus is partially suspended for the necessity of chemical washing, resulting in insufficient semipermeable membrane treatment, the feed rate of the concentrated water decreases. As a result, the osmotic pressure of the mixed water increases, and accordingly the energy for the operation of the second semipermeable membrane treatment apparatus (3) becomes higher than an ordinary level, making the low energy operation of the integrated sewage treatment-seawater desalination system difficult, though the low energy operation is an advantage of the system. Further, in the case where mixed water with a high osmotic pressure is treated in the second semipermeable membrane treatment apparatus (3), the feed pressure to the treatment medium (semipermeable membranes) in the second semipermeable membrane treatment apparatus (3) becomes high. Consequently a load acts on the treatment medium (semipermeable membranes) in the second semipermeable membrane treatment apparatus (3), and the life of the treatment medium becomes shorter than usual, to pose a problem that more frequent maintenance and exchange of treatment membranes become necessary. Further, depending on the specifications of the second semipermeable membrane treatment apparatus, there is also a problem that the operation of the second semipermeable membrane treatment apparatus (3) must be entirely or partially stopped.

Further, there is also a case where the flow rate of the water (A) undergoing treatment varies like sewage, industrial wastewater, etc. In the case where the flow rate of the water (A) undergoing treatment increases, if the flow rate is more than the flow rate that can be treated by the first semipermeable membrane treatment apparatus (2), a portion of the water (A) undergoing treatment cannot be treated. On the other hand, if the increase of the water (A) undergoing treatment is within the range that can be treated by the first semipermeable membrane treatment apparatus (2), it seems to be advantageous since the increase in the flow rate of the concentrated water outflowing from the first semipermeable membrane treatment apparatus (2) can lower the osmotic pressure of the mixed water obtained by mixing the concentrated water with the water (B) undergoing treatment. However, on the other hand, the impurities derived from the water (A) undergoing treatment are likely to clog the treatment medium (semipermeable membranes) in the second semipermeable membrane treatment apparatus (3). Consequently the life of the treatment medium becomes shorter than usual, to pose a problem that more frequent maintenance and exchange of the treatment medium become necessary. On the contrary, in the case where the flow rate of the water (A) undergoing treatment decreases, the flow rate of the concentrated water outflowing from the first semipermeable membrane treatment apparatus (2) decreases to prevent the stable treatment of the first semipermeable membrane treatment apparatus (2). At the same time, the osmotic pressure of the mixed water obtained by mixing the concentrated water and the water (B) undergoing treatment cannot be decreased to require more energy than usual for operating the second semipermeable membrane treatment apparatus (3), making the low energy operation of the integrated sewage treatment-seawater desalination system difficult, though the low energy operation is an advantage of the system, to pose a problem that both or either of the treatment apparatuses must be stopped entirely or partially.

Consequently the present inventors devised the fresh water generator as shown in FIGS. 2 to 8.

Figure 2:
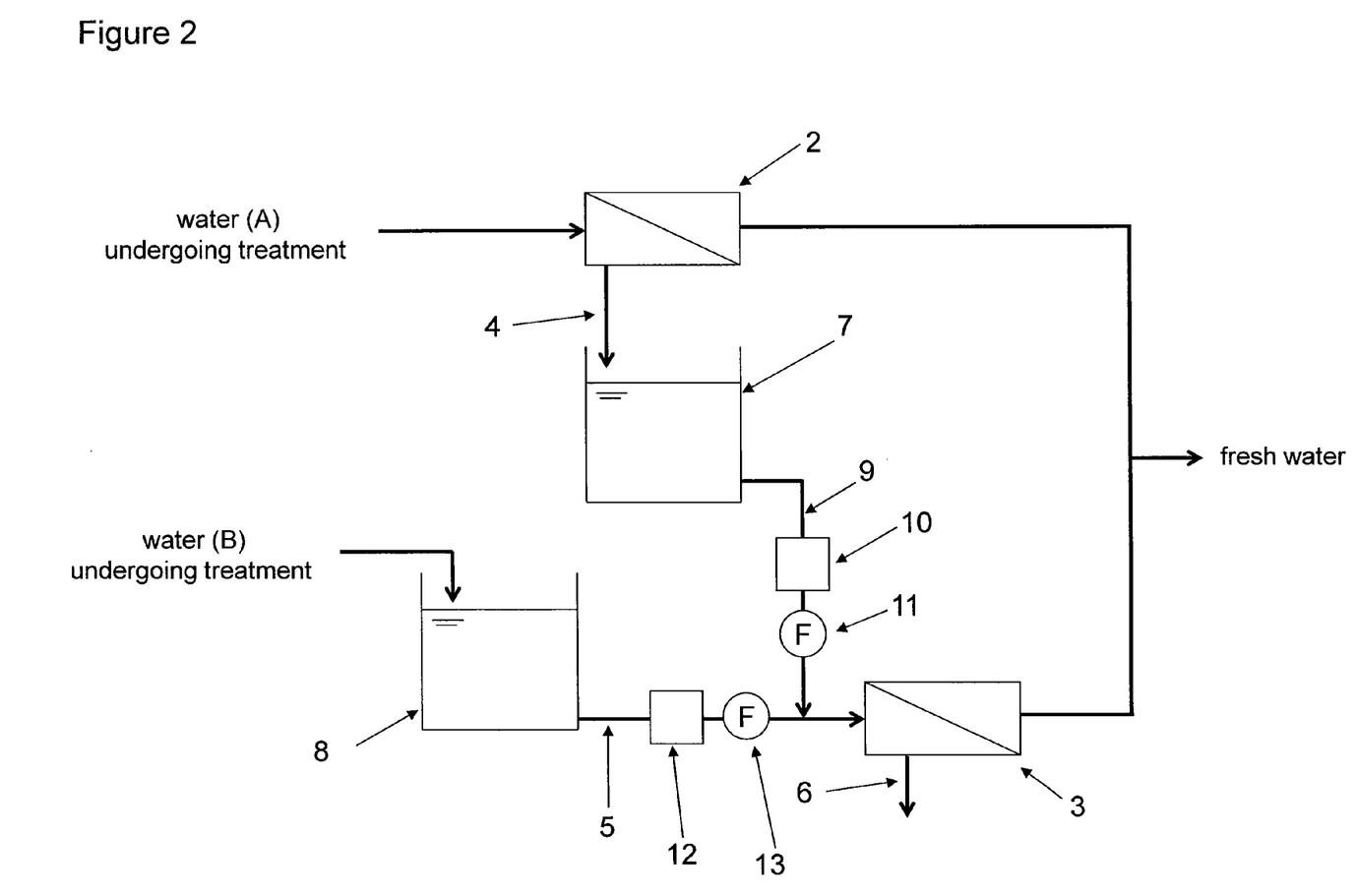
FIG. 2 is a flowchart showing an embodiment of the fresh water production system of this invention.

FIG. 2 shows an embodiment comprising a storage tank (A)(7) and a storage tank (B) (8) provided for storing the concentrated water outflowing from the first semipermeable membrane treatment apparatus (2) and the water (B) undergoing treatment respectively before they are joined, and means (10) to (13) provided for controlling the flow rates and flow rate ratio of the concentrated water and the water (B) undergoing treatment supplied from the storage tanks (A) and (B).

Figure 3:
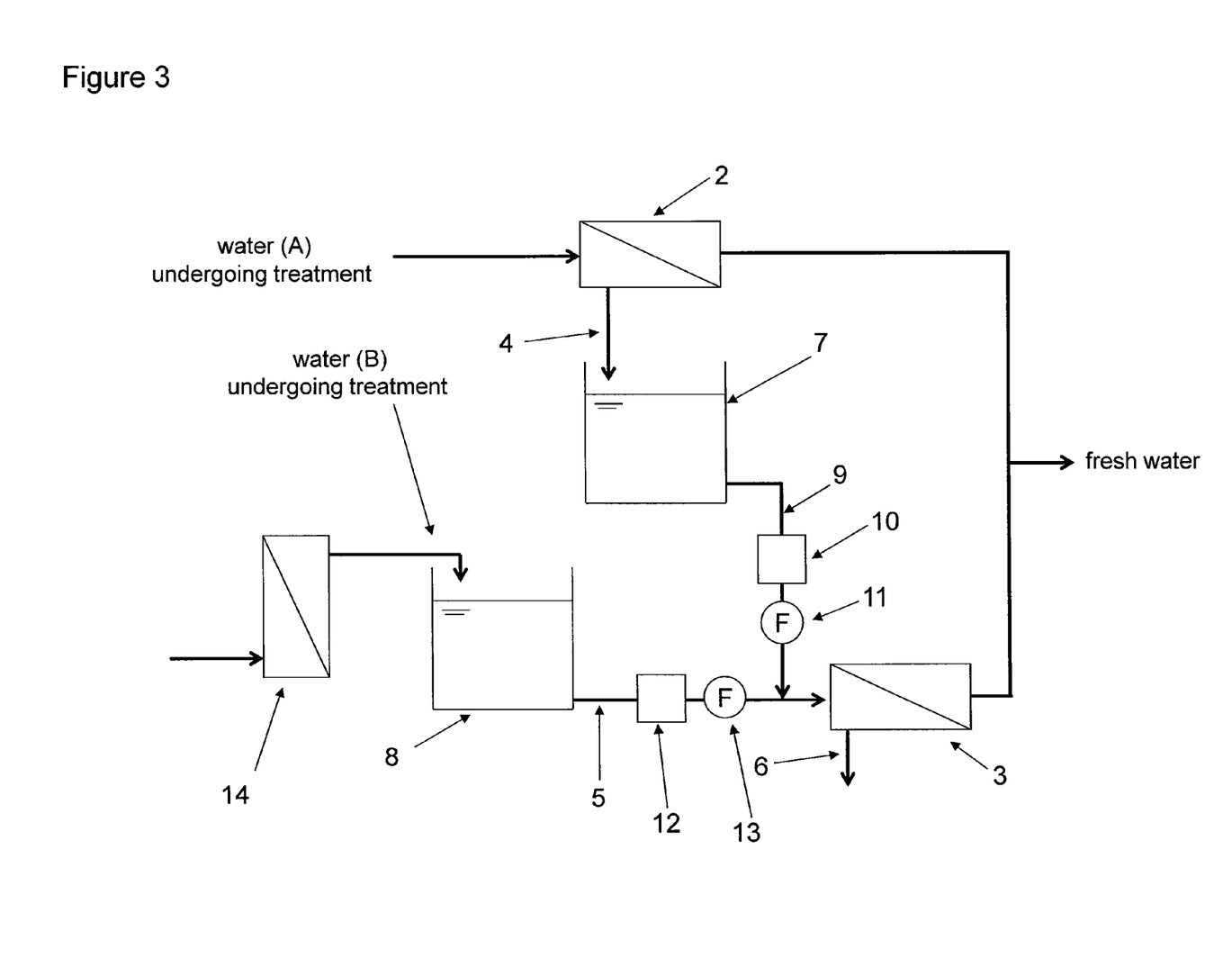
FIG. 3 is a flowchart showing another embodiment of the fresh water production system of this invention.

FIG. 3 shows an embodiment wherein the water (B) undergoing treatment is the water produced by treatment in a pretreatment apparatus (14) and is stored in the storage tank (B) (8), being supplied to the juncture with the concentrated water.

Figure 4:
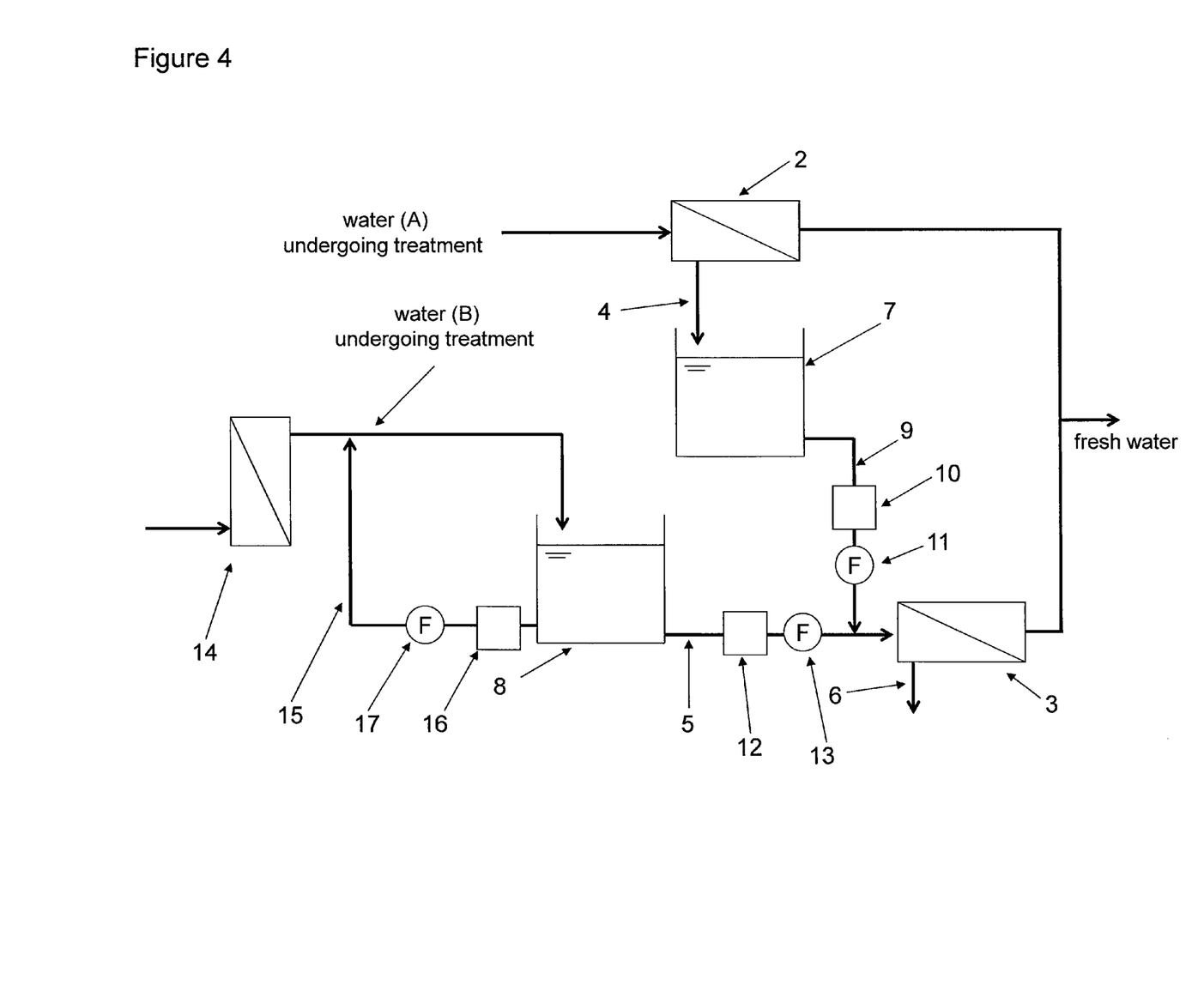
FIG. 4 is a flowchart showing a further other embodiment of the fresh water production system of this invention.

FIG. 4 shows an embodiment comprising a piping (15) capable of discharging the water (B) undergoing treatment stored in the storage tank (B)(8) from the storage tank, wherein the water (B) undergoing treatment discharged via the piping (15) is used for washing the pretreatment apparatus (14).

Figure 5:
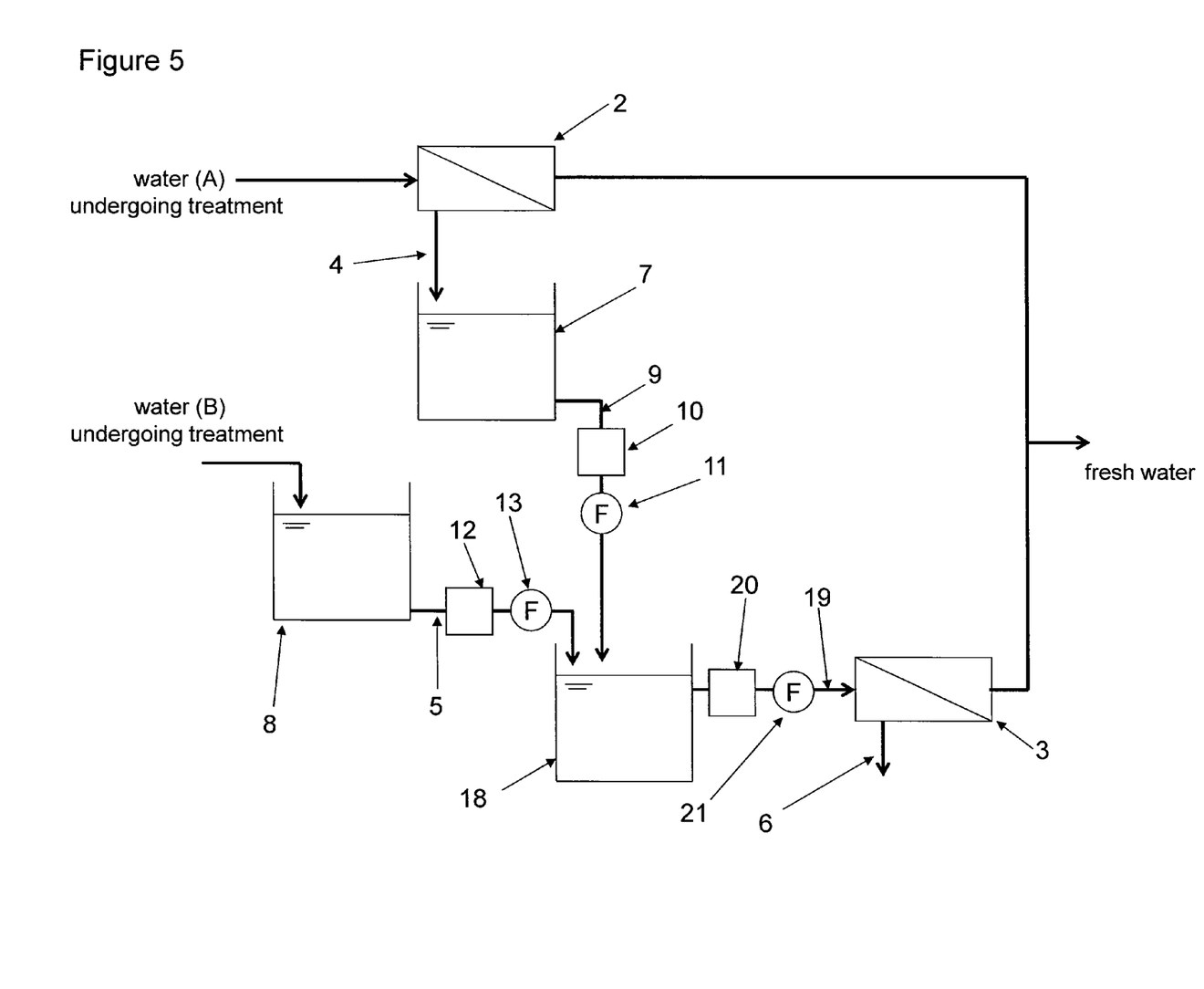
FIG. 5 is a flowchart showing a further other embodiment of the fresh water production system of this invention.

FIG. 5 shows an embodiment comprising a storage tank (C)(18) and a mixed water supply means (20) and a mixed water flow meter (21) as means for controlling the flow rate of the mixed water supplied from the storage tank (C) (18).

Figure 6:
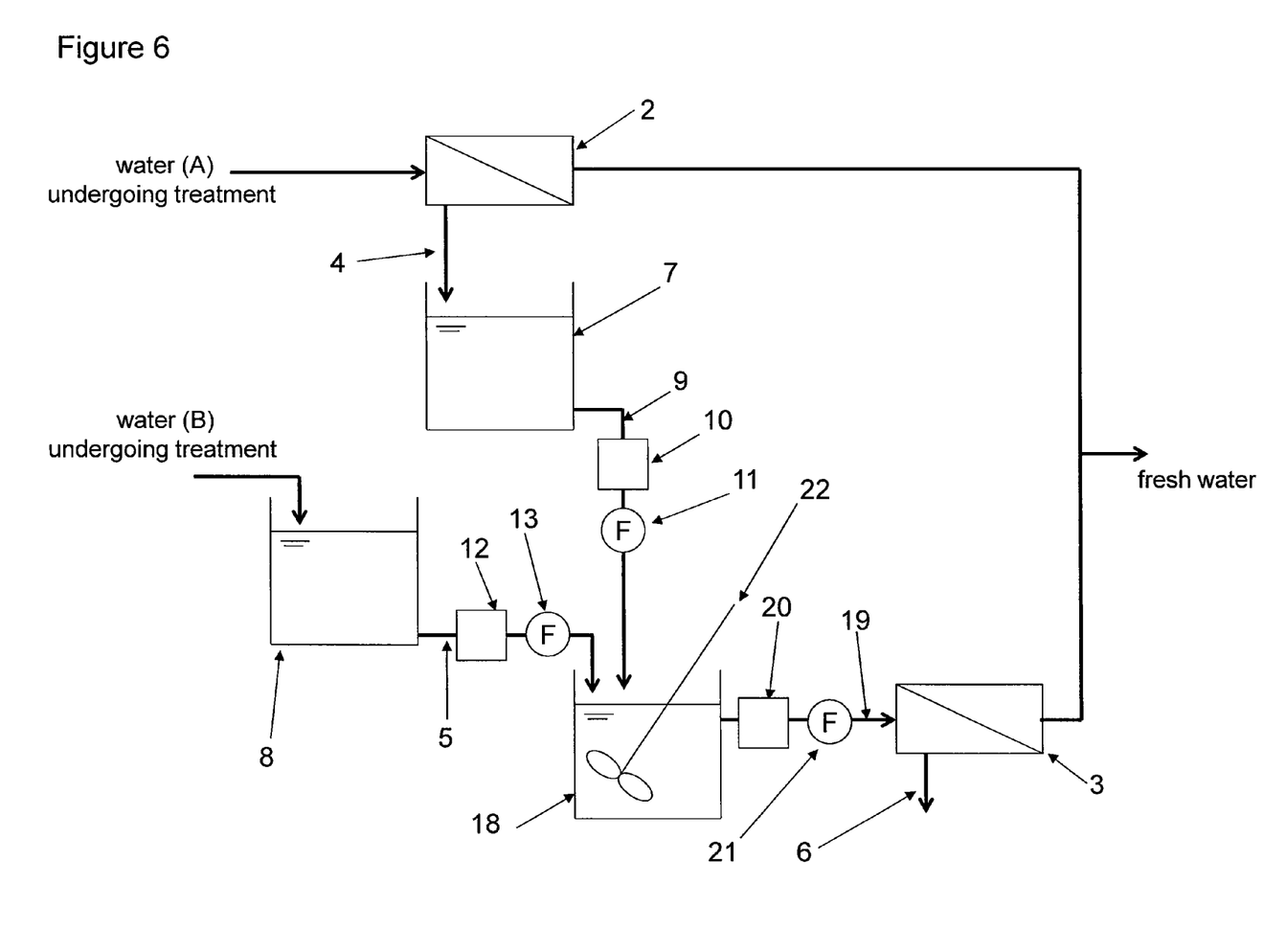
FIG. 6 is a flowchart showing a further other embodiment of the fresh water production system of this invention.

FIG. 6 shows an embodiment comprising a stirring means (22) installed in the storage tank (C) (18) as a means for mixing the concentrated water and the water (B) undergoing treatment.

Figure 7:
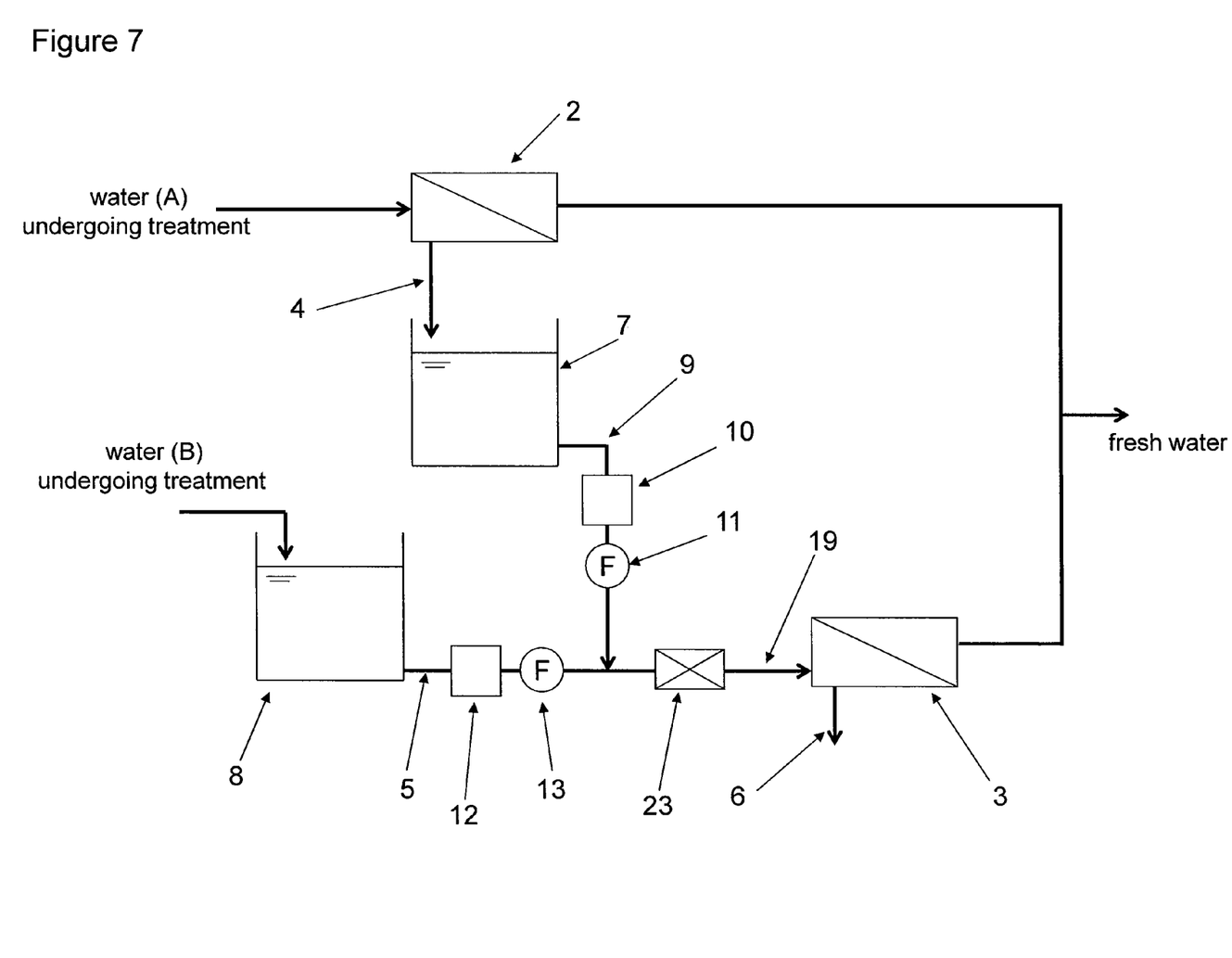
FIG. 7 is a flowchart showing a further other embodiment of the fresh water production system of this invention.

FIG. 7 shows an embodiment comprising an intra-pipe stirring device (23) installed as a means for mixing the concentrated water and the water (B) undergoing treatment.

Figure 8:
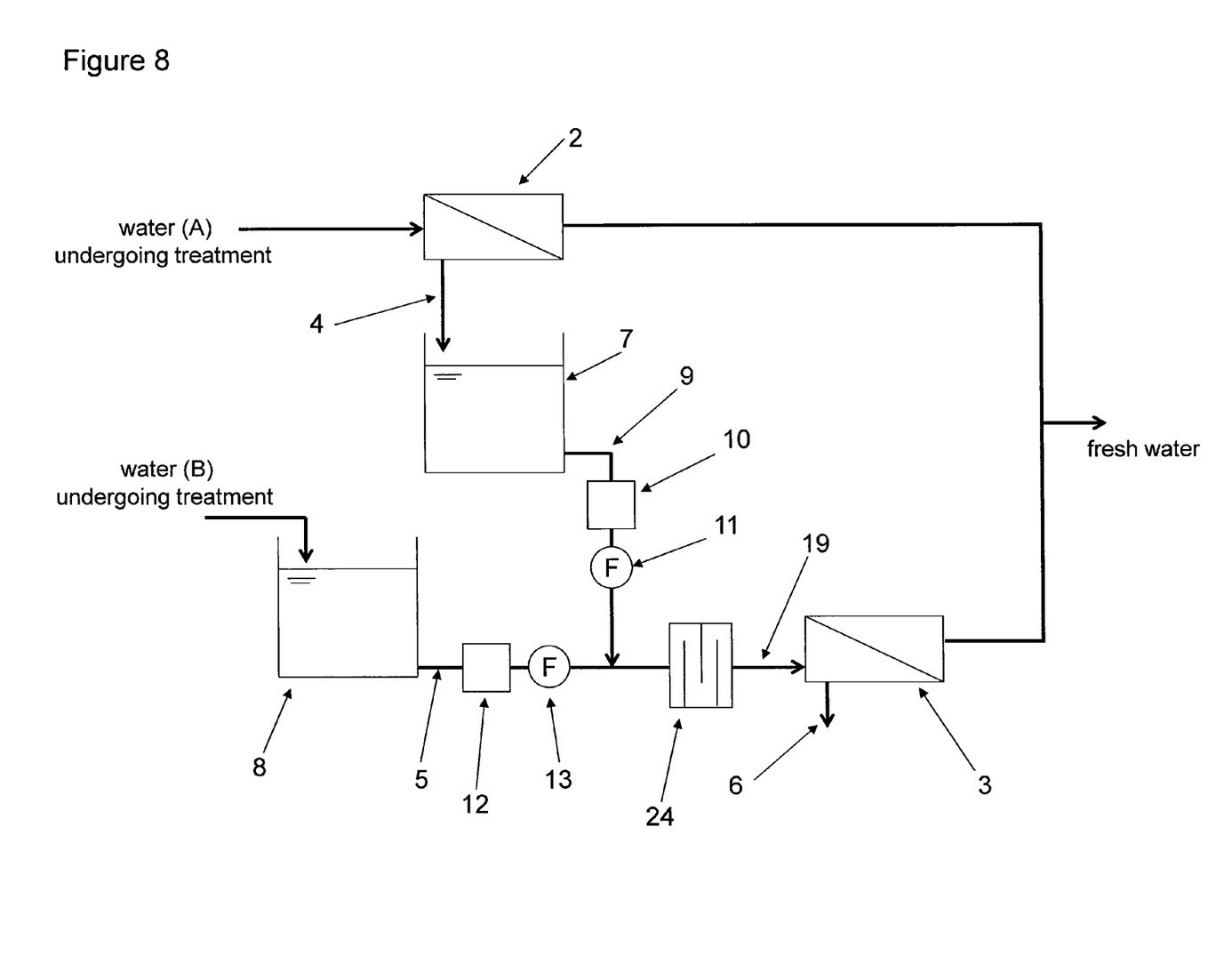
FIG. 8 is a flowchart showing a further other embodiment of the fresh water production system of this invention.

FIG. 8 shows an embodiment comprising baffle boards (24) installed as a means for mixing the concentrated water and the water (B) undergoing treatment.

In FIG. 2, the water (A) undergoing treatment is supplied to the first semipermeable membrane treatment apparatus (2), to be subjected to a treatment process (A), for obtaining freshwater and concentrated water. The outflowing concentrated water passes through a concentrated water piping (4) and is once stored in the storage tank (A) (7). The concentrated water stored in the storage tank (A) (7) flows through a concentrated water supply piping (9), to reach the juncture with the below-mentioned water (B) undergoing treatment. On the other hand, the water (B) undergoing treatment is once stored in the storage tank (B) (8). The stored water (B) undergoing treatment flows through a water (B) undergoing treatment supply piping (5), to reach the abovementioned juncture with the concentrated water.

The concentrated water and the water (B) undergoing treatment flowing through the respective supply pipings are mixed at the juncture, and the mixed water is then treated in the second semipermeable treatment apparatus (3), to obtain fresh water and concentrated water. The fresh water is discharged from the system as fresh water together with the fresh water from the first semipermeable membrane treatment apparatus (2). The concentrated water is discharged from the system through a second concentrated water piping (6).

In an exemplary embodiment of this invention, the storage tank (A) (7) and the storage tank (B) (8) are provided for storing the concentrated water and the water (B) undergoing treatment respectively before they are mixed, and means for controlling the flow rates of the concentrated water and the water (B) undergoing treatment respectively supplied from the storage tank (A) (7) and the storage tank (B) (8) are further provided halfway in the concentrated water supply piping (9) and the water (B) undergoing treatment supply piping (5). Therefore, even in the case where the feed rates of the respective types of raw water (water (A) undergoing treatment and water (B) undergoing treatment) change greatly, the mixed water consisting of the concentrated water and the water (B) undergoing treatment can be always controlled at a constant flow rate, and further the flow ratio of both the types of water can be also always controlled at a constant ratio (mixing ratio), when the mixed water is supplied to the second semipermeable membrane treatment apparatus (3). Consequently the second semipermeable membrane treatment apparatus (3) can be operated at a low load stably. Further, the respective flow rates can be controlled in reference to the concentrated water flow meter (11) and the water (B) undergoing treatment flow meter (13).

The storage tanks (A) and (B) are only required to respond to the qualities and quantities of the respective types of water stored therein. Further, though not shown in the drawings, an overflow piping to allow overflow draining when the water quantity exceeds a predetermined level can also be installed for each of the storage tanks.

In this fresh water production system, in order not to cause any inconvenience even if the concentrated water is mixed with the water (B) undergoing treatment, it is preferred that the osmotic pressure of the concentrated water obtained by the first semipermeable membrane treatment apparatus (2) is equal to or lower than the osmotic pressure of the water (B) undergoing treatment, and even after the concentrated water is mixed with the water (B) undergoing treatment, it is preferred that the osmotic pressure of the mixed water is equal to or lower than the osmotic pressure of the water (B) undergoing treatment. Therefore, it is preferred that the osmotic pressure of the water (A) undergoing treatment as the raw water of the concentrated water is also equal to or lower than the osmotic pressure of the water (B) undergoing treatment.

In order to establish the osmotic pressure relationship as described above, it is only required to use raw water with a low osmotic pressure as the water (A) undergoing treatment and raw water with a high osmotic pressure as the water (B) undergoing treatment. It is preferred to use water with a low salt concentration as the raw water with a low osmotic pressure and water with a high salt concentration as the raw water with a high osmotic pressure. The water with a low salt concentration can be, generally, sewage, industrial wastewater, river water or the water obtained by pretreating any of the foregoing types of water. Further, the water with a high salt concentration can be, generally, seawater, salt lake water, brine water or the water obtained by pretreating any of the foregoing types of water.

Especially in the case where water containing much impurities such as sewage or industrial wastewater is used as raw water, it is preferred to use the pretreated water obtained by removing the impurities by a pretreatment apparatus as the water (A) undergoing treatment or as the water (B) undergoing treatment. The pretreatment apparatuses that can be used here include an activated sludge treatment apparatus, two-stage treatment apparatus consisting of activated sludge and MF/UF membranes or sand filtration, MBR apparatus, MF/UF membrane filtration treatment apparatus, sand filtration treatment apparatus, etc.

Further, in order to efficiently operate the above-mentioned pretreatment apparatus, a coagulating agent, pH regulator and oxidizing agent such as sodium hypochlorite can also be added. Furthermore, in the case where membranes are used in the pretreatment apparatus, the membranes used are not especially limited either. Flat membranes, hollow fiber membranes, tubular membranes and membranes of any other forms can also be used as appropriate. The material of the membranes is not specially limited, but it is preferred that the material includes at least one selected from the group consisting of polyacrylonitrile, polyphenylenesulfone, polyphenylenesulfidesulfone, polyvinylidene fluoride, polypropylene, polyethylene, polysulfone, polyvinyl alcohol, cellulose acetate and inorganic materials such as ceramic.

If types of raw water are combined to ensure that the osmotic pressure of the aforementioned concentrated water may become equal to or lower than the osmotic pressure of the aforementioned water (B) undergoing treatment as described above, mixing the concentrated water allows the osmotic pressure of the water (B) undergoing treatment to decline. Therefore, the pressurization level of the mixed water supplied to the second semipermeable membrane treatment apparatus (3) can be kept low, and the energy can be lowered compared with the energy required when the water (B) undergoing treatment is treated alone in the second semipermeable membrane treatment apparatus.

The necessity of storing the concentrated water and the water (B) undergoing treatment in the storage tank (A) (7) and the storage tank (B) (8) respectively and further installing the means for controlling the flow rates of the concentrated water and the water (B) undergoing treatment supplied from the storage tank (A) (7) and the storage tank (B) (8) respectively halfway in the concentrated water supply piping (9) and the water (B) undergoing treatment supply piping (5) is described below in reference to examples.

In the case where any problem occurs in the whole or part of the first semipermeable membrane treatment apparatus (2) or in the case where a part of the apparatus stops to make the semipermeable membrane treatment insufficient owing to the necessity of chemical washing, the feed rate of the concentrated water joining the water (B) undergoing processing decreases. In this case, in order to maintain the mixing ratio between the concentrated water and the water (B) undergoing treatment, the feed rate of the mixed water to the second semipermeable membrane treatment apparatus (3) must be decreased to inevitably lower the production amount of fresh water by the second semipermeable membrane treatment apparatus (3) disadvantageously. However, in an exemplary embodiment of this invention, the concentrated water is stored in the storage tank (A)(7), and the means for controlling the flow rate (the concentrated water supply means (10) and the concentrated water flow meter (11)) are provided to allow the concentrated water to be supplied always without changing the flow rate. Further, in the case where the water (B) undergoing treatment is stored in the storage tank (B) (8), even if the water level of the concentrated water in the storage tank (A)(7) declines making it necessary to decrease the feed rate of the concentrated water, the means for controlling the flow rate of the water (B) undergoing treatment (the water (B) undergoing treatment supply means (12) and the water (B) undergoing treatment flow meter (13)) can be adjusted to allow the water (B) undergoing treatment to be supplied at a certain flow rate, further at a constant flow rate ratio (mixing ratio), i.e., to allow a constant osmotic pressure to be set. Thus, the second semipermeable membrane treatment apparatus (3) can be operated at low energy stably.

Further, if the flow rate of the water (A) undergoing treatment changes like sewage, industrial wastewater or the like, the flow rate of the concentrated water outflowing from the first semipermeable membrane treatment apparatus (2) also changes. In this case, if the concentrated water to the juncture with the water (B) undergoing treatment is supplied by using only the means for controlling the flow rate (the concentrated water supply means (10) and the concentrated water flow meter (11)), there occurs a disadvantage that in the case where the flow rate of the outflowing concentrated water is larger than the required feed rate, the concentrated water must be discharged outside the system. However, in an exemplary embodiment of this invention, the concentrated water is stored in the storage tank (A) (7), and the means for controlling the flow rate (the concentrated water supply means (10) and the concentrated water flow meter (11)) are provided. Therefore, the excessive portion of the concentrated water can be once stored in the storage tank (A) (7), and further the concentrated water can be supplied always without changing the flow rate by using the means for controlling the flow rate (the concentrated water supply means (10) and the concentrated water flow meter (11)). Furthermore, in the case where the water (B) undergoing treatment is stored in the storage tank (B) (8), even if the feed rate of the concentrated water must be inevitably temporarily changed, the means for controlling the flow rate of the water (B) undergoing treatment (the water (B) undergoing treatment supply means (12) and the water (B) undergoing treatment flow meter (13)) can be adjusted to keep a constant flow ratio (mixing ratio), i.e., to set a constant osmotic pressure. Thus, the second semipermeable membrane treatment apparatus (3) can be operated at low energy stably.

Further, in the case where the water quality of the water (A) undergoing treatment is worsened temporarily, the water quality of the concentrated water of the first semipermeable membrane treatment apparatus (2), obtained by treating the water (A) undergoing treatment, is also temporarily worsened. In the case where the concentrated water, the water quality of which is temporarily worsened, is mixed with the water (B) undergoing treatment and where the mixed water is treated by the second semipermeable membrane treatment apparatus (3), even if the mixing ratio is the same as usual, the treatment medium (semipermeable membranes) in the second semipermeable membrane treatment apparatus (3) is likely to be clogged by the impurities derived from the water (A) undergoing treatment, causing the life of the treatment medium to be shortened, resulting in a disadvantage that more frequent maintenance and exchange of the treatment medium become necessary. With regard to the worsening of water quality, even in the case where the installation of the storage tank is reversed, that is, even in the case where the storage tank (A) (7) and the means for controlling the flow rate (the concentrated water supply means (10) and the concentrated water flow meter (11)) are used for supplying the concentrated water, while the means for controlling the flow rate (the water (B) undergoing treatment supply means (12) and the water (B) undergoing treatment flow meter (13)) only are used for supplying the water (B) undergoing treatment, the same disadvantage as described above occurs. However, if both the concentrated water and the water (B) undergoing treatment are once stored in the storage tank (A) (7) and the storage tank (B) (8), the temporary worsening of water quality as described before can be decreased (leveled), and the influence on the flow rate ratio (mixing ratio) between the concentrated water and the water (B) undergoing treatment can be minimized.

Further, if the water (B) undergoing treatment is the water pretreated by the pretreatment apparatus (14) as shown in FIG. 3, storing the water (B) undergoing treatment in the storage tank (B) (8) is a preferred mode in view of reducing the initial cost for installing storage tanks. However, once storing in a storage tank different from the storage tank (B) (8) and then in the storage tank (B) (8) is also acceptable. Further, multiple storage tanks can also be installed between the pretreatment apparatus (14) and the storage tank (B) (8).

In the case where a piping (15) for discharging the water (B) undergoing treatment outside a tank is provided for the storage tank (B) (8) and/or to a storage tank different from the storage tank (B) (8) (FIG. 4), the water (B) undergoing treatment discharged from the tank can be used as water for periodically washing the first semipermeable membrane treatment apparatus (2), the second semipermeable membrane treatment apparatus (3) and the pretreatment apparatus (14), water for the plant, agricultural water or water for any of other various applications, and the application of the water is not especially limited.

In the case where the water (B) undergoing treatment produced in the pretreatment apparatus (14) in a preferred mode is stored in the storage tank (B) (8), the water level of the storage tank (B) (8) may temporarily change, since the water (B) undergoing treatment is, for example, periodically used for washing the pretreatment apparatus (14), and it can be supposed that the flow rate of the water (B) undergoing treatment supplied to the juncture with the concentrated water also changes temporarily. In this case, if the storage tank (A) (7) for storing the concentrated water is not provided and the flow rate of the concentrated water outflowing from the first semipermeable membrane treatment apparatus (2) is larger than the feed rate of the water (B) undergoing treatment, it is necessary to install a branch pipe halfway in the concentrated water piping (4), for discharging the concentrated water outside the system. Further, it is also necessary to control the flow rate for discharging the concentrated water. Otherwise, it can also be considered that the whole or a part of the first semipermeable membrane treatment apparatus must be stopped. However, if the concentrated water is stored in the storage tank (A) (7) and the means for controlling the flow rate of the concentrated water (the concentrated water supply means (10) and the concentrated water flow meter (11)) are provided, the feed rate of the concentrated water can be changed in response to the change of the flow rate of the water (B) undergoing treatment, and the flow rate ratio (mixing ratio) between the concentrated water and the water (B) undergoing treatment can be kept constant.

Further, in the case where the water (B) undergoing treatment does not change in flow rate but temporarily changes in water quality, it is necessary to change the feed rate of the concentrated water in order to keep the water quality of the mixed water consisting of the water (B) undergoing treatment and the concentrated water as usual. However, unless the concentrated water can be stored in the storage tank (A) (7), there is a disadvantage that the feed rate of the concentrated water cannot be temporarily changed. However, in an exemplary embodiment of this invention, the concentrated water is stored in the storage tank (A) (7) and the means for controlling the flow rate of the concentrated water (the concentrated water supply means (10) and the concentrated water flow meter (11)) are provided. Therefore, even in the case where the water (B) undergoing treatment, the water quality of which temporarily changes, is supplied from the storage tank (B) (8) to the juncture with the concentrated water, the feed rate of the concentrated water can be changed to make the water quality of the mixed water have an adequate level.

On the other hand, in the case where the water (B) undergoing treatment obtained from the pretreatment apparatus (14) is once stored in a storage tank different from the storage tank (B) (8), if the water (B) undergoing treatment is once stored in the storage tank different from the storage tank (B) (8) and subsequently stored in the storage tank (B) (8), the influence of the temporary change in the flow rate or in the water quality (osmotic pressure) of the water (B) undergoing treatment can be reduced (leveled) on the feed side of the water (B) undergoing treatment, and the flow rate ratio (mixing ratio) between the water (B) undergoing treatment and the concentrated water can be kept constant.

In this connection, in the case where the water level in the storage tank different from the storage tank (B) (8) temporarily changes since the water (B) undergoing treatment (B) in the storage tank different from the storage tank (B) (8) is used, for example, for periodically washing the pretreatment apparatus (14), the feed rate of the water (B) undergoing treatment to the storage tank (B) (8) changes, but since the water (B) undergoing treatment is stored in the storage tank (B) (8), the feed rate required for mixing with the concentrated water does not change, and further the concentrated water is stored in the storage tank (A) (7) and can be supplied always at a constant rate. Therefore, the concentrated water and the water (B) undergoing treatment can keep a constant flow rate ratio (mixing ratio).

That is, unless both the storage tank on the concentrated water side and the storage tank on the water (B) undergoing treatment side are provided, in the case where the feed rate or water quality of water on either side changes, it can happen that the mixing ratio of the mixed water cannot be kept constant, or in the case where water quality changes even if the osmotic pressure of the mixed water remains constant, the flow rates and the flow rate ratio (mixing ratio) of the source water streams of the mixed water supplied to the second semipermeable membrane treatment apparatus (3) cannot be kept constant, resulting in a disadvantage that stable operation becomes difficult. However, in the fresh water generator of an exemplary embodiment of this invention, the feed rate of the other source water stream of the mixed water can be flexibly changed, and the disadvantage as described above can be overcome.

As the concentrated water supply means (10) and the water (B) undergoing treatment supply means (12) provided respectively in the pipings (9) and (5) for discharging the concentrated water from the storage tank (A) (7) and the water (B) undergoing treatment from the storage tank (B) (8), any desired flow rate control means can be employed. For example, electromagnetically opening-closing valves capable of adjusting the openings thereof for flow rate control, inverter-controlled opening-closing valves capable of adjusting the openings thereof for flow rate control, or pumps capable of inverter-controlling the feed rates thereof for flow rate control can be installed. As each electromagnetic opening-closing valve or inverter-controlled opening-closing valve, a butter fly valve, cone valve, ball valve, sleeve valve, multi-hole variable orifice valve, etc. can be preferably used. On the other hand, the inverter-controlled pump is not especially limited in type, and any of a centrifugal pump, mixed flow pump and axial flow pump can be preferably used. Moreover, the flow rate by a pump can be controlled by deciding the number of pumps operated or setting a rotational speed of a pump at a predetermined level.

In the case where a means poor in water feed function such as an electromagnetic opening-closing valve or inverter-controlled opening-closing valve is used as a flow rate control means, it is preferred to install a pump for supplementally controlling the water stream in the piping in order to secure a specified flow rate. Further, in the case where an inverter-controlled pump is installed as a flow rate control means, it is preferred to install an opening-closing valve together.

In order to know the flow rates of the concentrated water and the water (B) undergoing treatment controlled by these flow rate control means, the flow meters (11) and (13) are installed near those flow rate control means on the upstream side or the downstream side, to monitor the flow rates, and the above-mentioned flow rate control means are controlled to achieve predetermined flow rates. As the flow meters used here, any flow meters such as electromagnetic flow meters, ultrasonic flow meters, differential pressure flow meters and area flow meters can be preferably used.

Further, as the method for joining the concentrated water and the water (B) undergoing treatment, the method of once storing in the storage tank (C) (18) as show in FIG. 5 is preferred to the method of joining in the supply pipings of the concentrated water and the water (B) undergoing treatment as shown in FIG. 2. In the case where the concentrated water and the water (B) undergoing treatment are mixed in the storage tank (C) (18), even if either the concentrated water supply means (10) or the water (B) undergoing treatment supply means (12) becomes defective, not allowing the flow rate of the concentrated water or the water (B) undergoing treatment to be adjusted, the concentrated water and the water (B) undergoing treatment can be temporarily retained in the storage tank (C) (18) and respectively mixed, to provide an advantage that the mixing ratio of the concentrated water and the water (B) undergoing treatment can be kept constant. Further, if a mixed water supply means (20) for supplying the mixed water of the storage tank (C) (18) to the second semipermeable membrane treatment apparatus (3) is installed together, the flow rate of the mixed water supplied to the second semipermeable membrane treatment apparatus (3) can be controlled to be constant.

Further, for example, in the case where the water quality of the water (A) undergoing treatment temporarily changes, the water quality of the concentrated water of the first semipermeable membrane treatment apparatus (2) for treating the water derived from the water (A) undergoing treatment also temporarily changes. However, since the storage tank (C) (18) is installed, the influence on the concentrated water decreased (leveled) by the aforementioned storage tank (A) (7) is further decreased (leveled) by the storage tank (C) (18), and therefore the influence on the flow rate ratio (mixing ratio) between the concentrated water and the water (B) undergoing treatment can also be decreased. The same applies also in the case where the water (B) undergoing treatment temporarily changes in water quality on the contrary, and the influence on the water (B) undergoing treatment decreased (leveled) by the storage tank (B) (8) is further decreased (leveled) by the storage tank (C) (18), and therefore the influence on the flow rate ratio (mixing ratio) between the water (B) undergoing treatment and the concentrated water can also be decreased.

In this case, the storage tank (C) (18) is only required to be an adequate water tank responding to the water quality and amount of the stored water. Further, though not shown in the drawing, an overflow piping for allowing overflow draining when the water amount exceeds a predetermined level may also be installed.

As the mixed water supply means (20) provided in the piping (19) for discharging the mixed water from the storage tank (C) (18), any desired flow control means can be employed like the concentrated water supply means (10) and the water (B) undergoing treatment supply means (12). Further, in order to measure the flow rate of the mixed water controlled by the mixed water supply means (20), a flow meter (21) is installed on the side downstream or upstream of the mixed water supply means (20), to monitor the flow rate, for controlling the abovementioned mixed water supply means (20), to achieve a predetermined flow rate. As the flow meter used here, any flow meter such as an electromagnetic flow meter, ultrasonic flow meter, differential pressure flow meter and area flow meter can be preferably used.

Further, in FIGS. 6 to 8, a mixing means for positively mixing the concentrated water and the water (B) undergoing treatment is provided. Examples of the mixing means include a stirring means installed in the storage tank (C) (18) (FIG. 6), an intra-pipe stirring device (FIG. 7) and a stirring means provided with baffle plates (FIG. 8), and any of them can be preferably installed. Furthermore, different mixing means can also be used together. In the case where a mixing means for positively mixing the concentrated water and the water (B) undergoing treatment is installed as shown in FIGS. 6 to 8, more effective mixing than the mixing by mere retention in the storage tank (C) (18) can be achieved, and the mixing ratio between the concentrated water and the water (B) undergoing treatment in the mixed water fed to the second semipermeable membrane treatment apparatus (3) can be always kept constant.

In the mixing means shown in FIG. 6, the stirring means (22) provided in the storage tank (C) (18) can be any means such as stirring using a pump, stirring by the circulation stream formed by feeding air bubbles from below the storage tank, stirring by a propeller or blade disc turbine or curved blades.

The intra-pipe stirring device (23) shown in FIG. 7 has a function of mixing and stirring the fluid in the piping by the flow of the fluid and can also be called an intra-pipe mixing device or line mixer. It is installed in a pipe when used. That is, it is a mixing and stirring device having mixing elements such as dividing plates or displacing plates in a piping, to continuously divide and reverse the stream, thereby causing mixing and stirring.

Further, the baffle boards (24) shown in FIG. 8 are used to form a vertically alternately turning stream, horizontally alternately turning stream or combined stream. The stirring using the baffle boards (24) is caused by using the energy of the water stream per se, and therefore if the flow rate is small, the stirring is extremely insufficient. For this reason, in the case where this method is used for stirring, it is preferred that the flow rate is maintained in a predetermined flow rate range. Further, in the case where this method is used under such a condition that the flow rate can change, it is preferred that the size and number of baffle boards (24) can be changed so that a certain level of stirring can be maintained even if the flow rate changes.

In FIG. 7 or 8, the concentrated water and the water (B) undergoing treatment are positively mixed by the intra-pipe stirring device (23) or the baffle boards (24) and the mixed water is directly supplied to the second semipermeable membrane treatment apparatus (3). However, a more preferred mode is that the mixed water obtained by mixing using the intra-pipe stirring device (23) or the baffle boards (24) is once stored in the storage tank (C) (18) and is then supplied to the second semipermeable membrane treatment apparatus (3) by the mixed water supply means (20), since the flow rate of the water supplied to the second semipermeable membrane treatment apparatus (3) can be always kept constant.

At the juncture at which the concentrated water supply piping (9) and the water (B) undergoing treatment supply piping (5) join, the respective source water streams are controlled to ensure that the ratio of water feed rates may become a predetermined level. The water feed rate ratio can be controlled by controlling to ensure that the feed rates of the respective source water streams may become predetermined levels.

The concentrated water and the water (B) undergoing treatment, the flow rates and the flow rate ratio of which are controlled as described above, are joined and subsequently homogenized to have a uniform osmotic pressure, and the mixed water is supplied into the second semipermeable membrane treatment apparatus (3) at a constant flow rate, to be treated and separated into fresh water and concentrated water.

The first semipermeable membrane treatment apparatus (2) for treating the water (A) undergoing treatment and the second semipermeable membrane treatment apparatus (3) for treating the mixed water consisting of the concentrated water and the water (B) undergoing treatment are explained below. A semipermeable membrane refers to a membrane not allowing the permeation of some components of the water undergoing treatment, and can be, for example, a semipermeable membrane that allows the permeation of a solvent and does not allow the permeation of solutes, being also called a reverse osmosis membrane. Examples of the semipermeable membranes used in water treatment technology include NF membranes and RO membranes. NF membranes and RO membranes are required to have such performance that the solutes contained in the water undergoing treatment can be decreased to such a concentration as to allow the remaining water to be used as regenerated water. Specifically the membranes are requested to have such performance as to block various ions of salts, mineral components, etc., for example, divalent ions such as calcium ions, magnesium ions and sulfate ions, monovalent ions such as sodium ions, potassium ions and chlorine ions, and dissolvable organic substances such as humic acid (molecular weight $M_w \geq 100,000$), fulvic acid (molecular weight $M_w=100$ to 1,000), alcohols, ethers and saccharides. An NF membrane is defined as a reverse osmosis membrane having an operation pressure of 1.5 MPa or less, a fractional molecular weight of 200 to 1,000 and a sodium chloride blocking rate of 90% or less, and a membrane that has a fractional molecular weight smaller than said range and a blocking rate higher than said range is called an RO membrane. Further, an RO membrane close to an NF membrane is also called a loose RO membrane.

NF membranes and RO membranes are available as hollow fiber membranes and flat membranes in view of form, and both the forms can be applied in this invention. Further, to facilitate handling, a fluid separation element with hollow fiber membranes or flat membranes accommodated in a housing can also be used. With regard to the fluid separation element, in the case where flat NF membranes or flat RO membranes are used, for example, preferred is a structure in which a membrane unit containing NF membranes or RO membranes, a permeating water channel material such as tricot and a feed water channel material such as a plastic net, which is wound around a cylindrical central pipe having numerous holes therethrough, is accommodated in a cylindrical housing. A separation membrane module in which multiple fluid separation elements, each as described above, are connected in series or in parallel to each other, is also preferred. In the fluid separation membrane, feed water is supplied from one end into the unit, and the permeating water that permeates the NF membranes or RO membranes before the feed water reaches the other end flows into the central pipe, being discharged from the central pipe at the other end. On the other hand, the feed water that does not permeate the NF membranes or RO membranes is discharged as concentrated water at the other end.

As the material of the NF membranes or RO membranes, cellulose acetate or a polymer material such as cellulose-based polymer, polyamide or vinyl polymer can be used. A typical NF membrane/RO membrane can be a cellulose acetate-based or polyamide-based asymmetric membrane or a composite membrane having a polyamide-based or polyurea-based active layer.

This invention can be suitably applied to a composite fresh water production system for producing fresh water from multiple types of raw water different in osmotic pressure such as sewage and seawater.

MEANINGS OF SYMBOLS

1: pretreatment apparatus
2: first semipermeable treatment apparatus
3: second semipermeable treatment apparatus
4: concentrated water piping of first semipermeable membrane treatment apparatus
5: water (B) undergoing treatment supply piping
6: concentrated water piping of second semipermeable membrane treatment apparatus
7: storage tank (A)
8: storage tank (B)
9: concentrated water supply piping downstream of first semipermeable membrane treatment apparatus
10: concentrated water supply means downstream of first semipermeable membrane treatment apparatus
11: concentrated water flow meter downstream of first semipermeable membrane treatment apparatus
12: Water (B) undergoing treatment supply means
13: Water (B) undergoing treatment flow meter
14: pretreatment apparatus
15: water (B) undergoing treatment discharge piping
16: discharged water (B) undergoing treatment supply means
17: unloaded water (B) undergoing treatment flow meter
18: storage tank (C)
19: mixed water supply piping
20: mixed water supply means
21: mixed water flow meter
22: stirring means
23: intra-pipe stirring device
24: baffle boards

The invention claimed is:
1. A fresh water generator comprising:
a first treatment system for producing fresh water by treating a first water having a low salt concentration undergoing treatment and including a first semipermeable membrane treatment apparatus to produce a concentrated water and fresh water;
a second treatment system constructed for mixing the concentrated water from the first semipermeable membrane treatment apparatus with a separately supplied second water having a high salt concentration undergoing treat- ment to produce a mixed water and including a second semipermeable membrane treatment apparatus for producing fresh water;

a first storage tank for storing the concentrated water from the first semipermeable membrane treatment apparatus and supplying the concentrated water to a point of mixing with the second water undergoing treatment;

a second storage tank for storing the second water undergoing treatment and supplying the second water to the point of mixing of the concentrated water and the second water undergoing treatment;

a first means for controlling the flow rate of the concentrated water supplied from the first storage tank;

a second means for controlling the flow rate of the second water undergoing treatment supplied from the second storage tank, wherein the osmotic pressure of the first water undergoing treatment is equal to or lower than the osmotic pressure of the second water undergoing treatment; and a point of mixing of the fresh water obtained from the first water and the fresh water obtained from the mixed water to provide a produced, mixed fresh water wherein the osmotic pressure of the concentrated water is equal to or lower than the osmotic pressure of the second water undergoing treatment.

2. A fresh water generator, according to claim 1, wherein a pretreatment apparatus is provided upstream of the second storage tank.

3. A fresh water generator, according to claim 1, wherein a third storage tank for storing the concentrated water and the second water undergoing treatment is provided, and a third means for controlling the flow rate of the mixed water supplied from the third storage tank to the second semipermeable membrane treatment apparatus is further provided.

4. A fresh water generator, according to claim 1, wherein a means for mixing the concentrated water and the second water undergoing treatment is provided.

5. A fresh water generator, according to claim 4, wherein the means for mixing is selected from the group consisting of a storage tank provided with a stirring means, an intra-pipe stirring device and a stirring means provided with baffle boards.

6. A fresh water generator, according to claim 1, wherein the first means for controlling the flow rate and the second means for controlling the flow rate are selected from the group consisting of electromagnetic opening-closing valves capable of controlling the openings thereof for flow control, inverter-controlled opening-closing valves capable of controlling the openings thereof for flow control, and pumps capable of inverter-controlling the feed rates thereof for flow control.

7. A process for producing fresh water, comprising:
   a) treating a first water in a first semipermeable membrane apparatus to obtain a concentrated water and fresh water;
   b) storing the concentrated water in a first storage tank;
   c) supplying the concentrated water from the first storage tank to a means for mixing, wherein the flow rate of the concentrated water is controlled by a first means for controlling flow rate;
   e) supplying a second water stored in a second storage tank from the second storage tank to the means for mixing, wherein the flow rate of the second water is controlled by a second means for controlling flow rate;
   f) mixing the concentrated water and the second water in the means for mixing to obtain a mixed water; and
   g) treating the mixed water in a second semipermeable membrane treatment apparatus to obtain fresh water;
   wherein the osmotic pressure of the first water is equal to or lower than the osmotic pressure of the second water, and wherein the fresh water obtained from the first water and the fresh water obtained from the mixed water are mixed to provide a produced, mixed fresh water.

* * * * *